United States Patent [19]

Boulianne

[11] 4,393,953
[45] Jul. 19, 1983

[54] SNOWMOBILE

[76] Inventor: Roland Boulianne, 227 de la Fabrique St., Jonquière, Canada, G7X 3N8

[21] Appl. No.: 271,772

[22] Filed: Jun. 8, 1981

[51] Int. Cl.³ .......................................... B62M 27/02
[52] U.S. Cl. ..................................... 180/190; 280/11; 280/15
[58] Field of Search ...................... 180/190; 280/9, 10, 280/11, 15, 16, 17

[56] References Cited

U.S. PATENT DOCUMENTS

| 861,037 | 7/1907 | Kubelka | 280/11 X |
| 918,431 | 4/1909 | Frye | 180/190 |
| 1,229,161 | 6/1917 | Stanley | 280/11 X |
| 2,683,608 | 7/1954 | Matheson | 280/9 |
| 3,487,437 | 12/1969 | Meskan | 180/190 |
| 3,605,926 | 9/1971 | Leonawicz | 180/190 X |
| 3,635,488 | 1/1972 | Bauer | 280/16 |

FOREIGN PATENT DOCUMENTS 499819 2/1954 Canada .
875366 7/1971 Canada .

Primary Examiner—John A. Pekar

[57] ABSTRACT

A snowmobile of the type comprising a conventional front ski assembly and endless track but also a rear ski assembly and characterized by the latter, being pivotally connected relative to the body of the snowmobile and adjustable in height relative to the rear end of the endless track for improved longitudinal stability and comfort, better longitudinal load distribution and adjustment in relation with the condition of the snow on the ground and the desired traction. A suspension arm system resiliently and adjustably attaches the rear end of the endless track and the rear ski assembly to the body of the snowmobile with a remote control for selective adjustment of the height as aforementioned.

9 Claims, 15 Drawing Figures

SNOWMOBILE

This invention relates to a rear ski and suspension assembly for adjustable attachment to a snowmobile and to a snowmobile of the type provided with such rear ski assembly.

Snowmobiles of the above type have previously been proposed merely to carry and laterally stabilize the rear of a snowmobile as defined in Canadian Pat Nos. 499,819, of Feb. 9, 1954, and 875,368, of July 13, 1971, and in U.S. Pat. No. 3,605,926, of Sept. 20, 1971.

It is a general object of the present invention to provide a rear ski and suspension assembly for adjustable attachment to a snowmobile and to a snowmobile of the above type in which the rear ski and suspension assembly is constructed and arranged to contribute more longitudinal stability and comfort, better longitudinal load distribution and adjustability in relation to different conditions of snow and/or of traction requirements.

It is a more specific object of the present invention to provide a snowmobile of the above type and a rear ski assembly that connects to the rear of the endless track through a suspension arm system for pivotal adjustment of their height and resilient suspension one relative to the other.

It is an object of the present invention to provide a snowmobile of the above type, in which the rear ski assembly and the endless track are articulated relative to each other longitudinally of the snowmobile to resiliently follow the ground contour and thereby provide increased longitudinal stability, reduced bouncing of the rear of the snowmobile and increased comfort for the user.

It is still another object of the present invention to provide a snowmobile of the above type with a rear ski and suspension assembly in which a rear ski assembly and the rear end of the endless track are articulated relative to each other, resiliently suspended, and also adjustable in height relative to each other to adjust the traction performance in relation with the density and type of snow on the ground and in relation with the needed power, such as to get out of a bad situation, to climb a hill or obstacle, to tow or be towed, to merely slide downhill, to go at higher speeds, etc.

The above and other objects and advantages of the present invention will be better understood with reference to the following detailed description of preferred embodiments thereof which are illustrated, by way of examples, in the accompanying drawings, in which.

Figure 1:
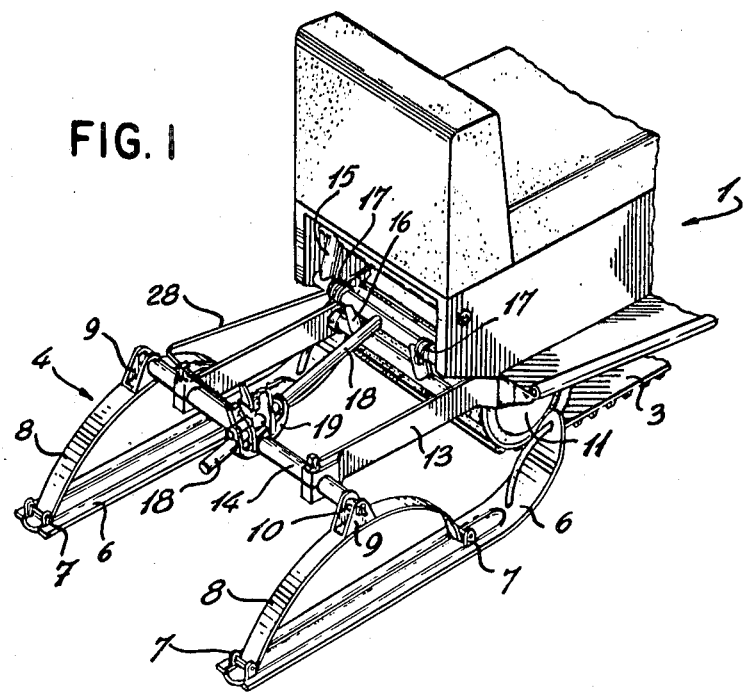
FIG. 1 is a perspective view of the rear of a snowmobile provided with a rear ski and suspension assembly according to a first embodiment of the present invention.
Figure 2:
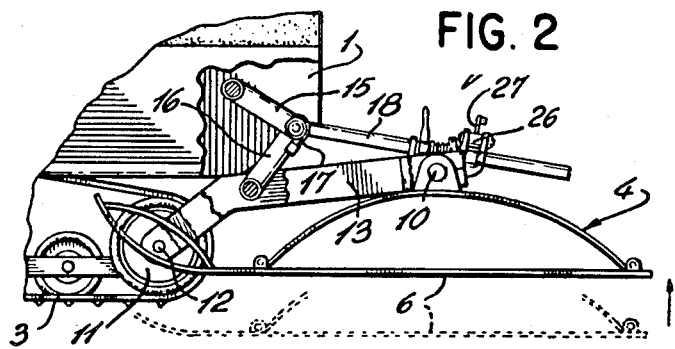
FIG. 2 is a side elevation view of the rear of the snowmobile and of the rear and suspension assembly and according to the embodiment of FIG. 1.
Figure 3:
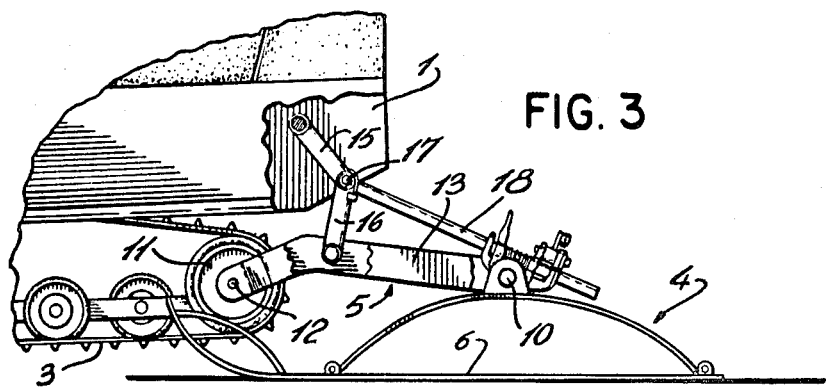
FIG. 3 is a view similar to the view of FIG. 2 but with the rear ski and suspension assembly in lowered position.
Figure 4:
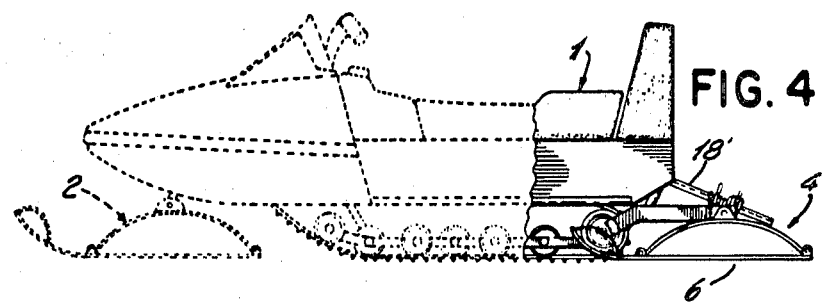
Figure 5:
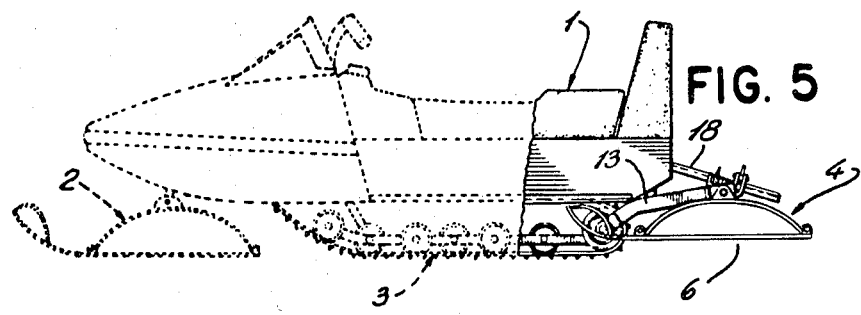
Figure 6:
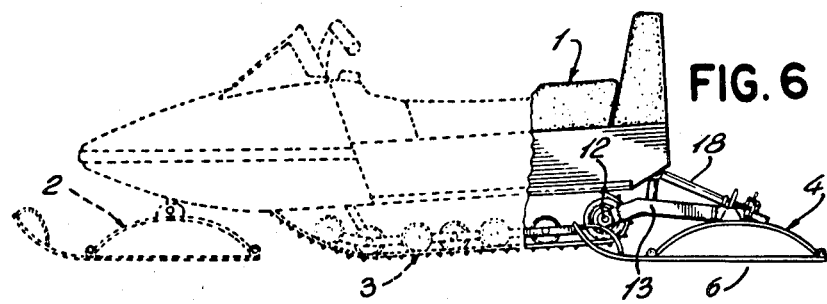
Figure 7:
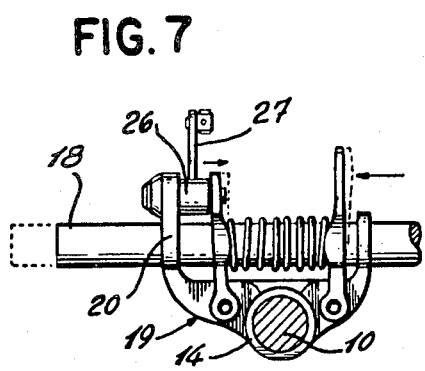
Figure 8:
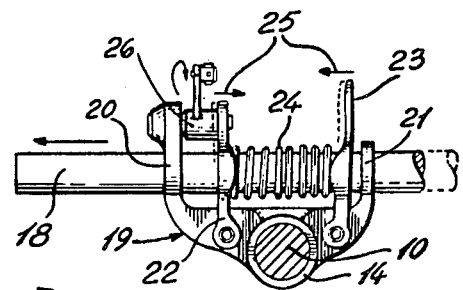
Figure 9:
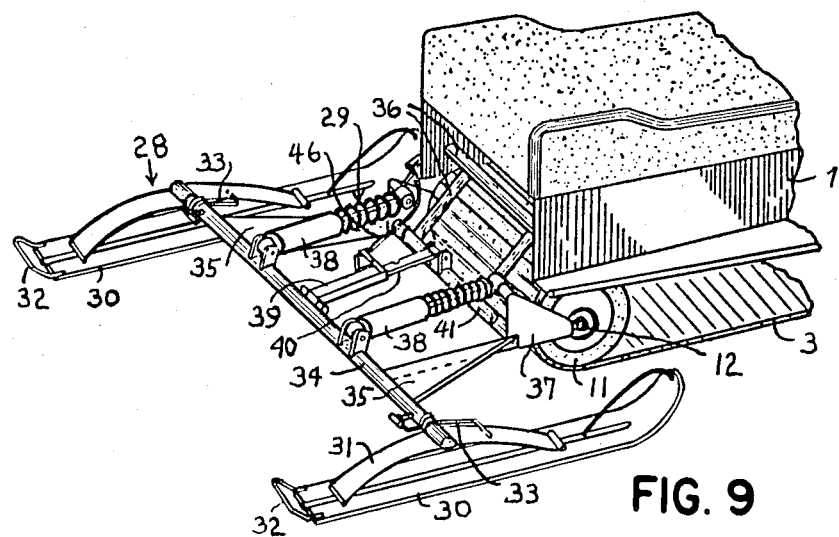
Figure 10:
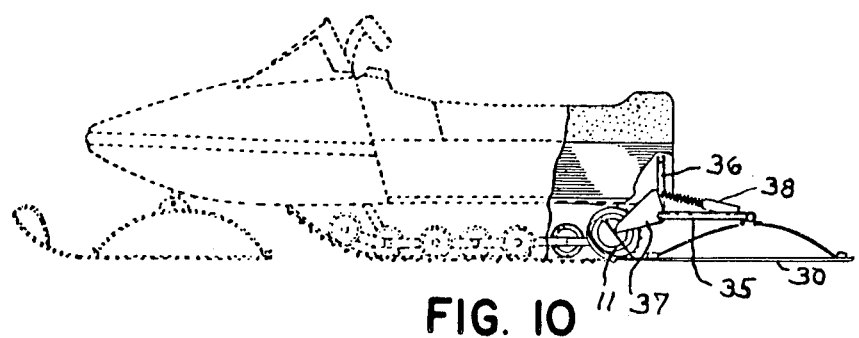
Figure 11:
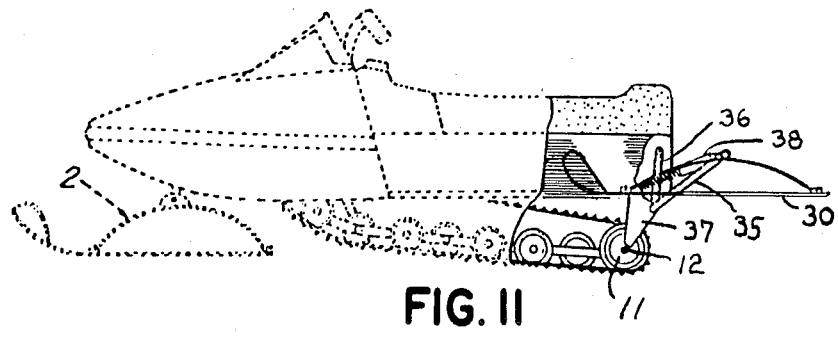
Figure 12:
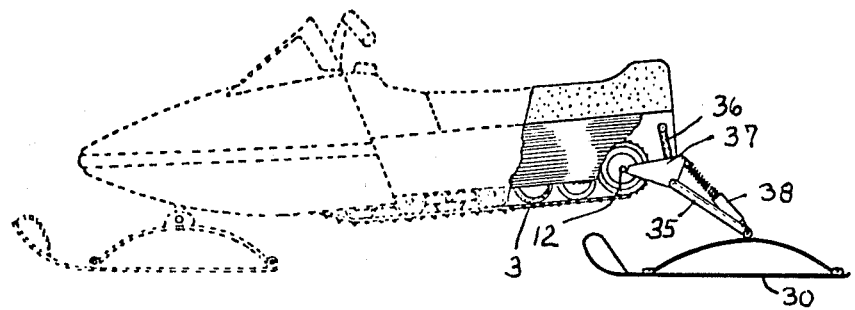
Figure 13:
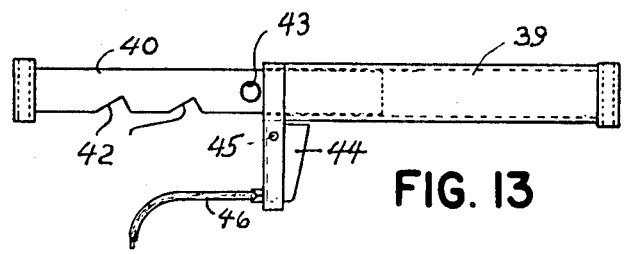
Figure 14:
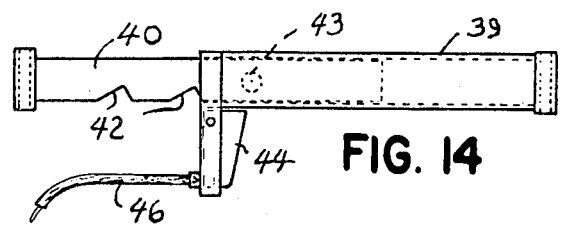
Figure 15:
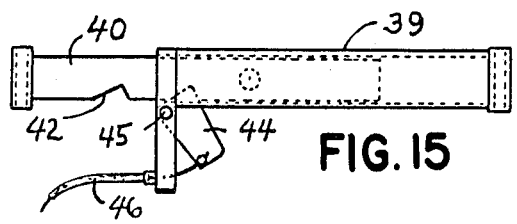

FIGS. 4, 5, and 6 are side elevation views of a snowmobile with the front part in phantom lines and with the rear ski and suspension assembly according to FIGS. 1, 2, and 3, shown in level, upper and lower positions, respectively, relative to the endless track of the snowmobile;

FIGS. 7 and 8 are enlarged side views of a clamping and remote control mechanism for selective adjustment of the relative height between the rear end of the endless track and the rear ski assembly of the preceding FIGS;

FIG. 9 is a view corresponding to the view of FIG. 1 but with a rear ski assembly according to a second embodiment of the present invention;

FIGS. 10, 11, and 12 are side elevation views with the rear ski assembly of FIG. 9 shown in level, upper and lower positions, respectively, relative to the endless track of a snowmobile shown mostly in dotted lines; and FIGS. 13, 14, and 15 are top views of a clamping and remote-controlled mechanism forming part of the second embodiment of FIGS. 9 to 12 inclusive.

The snowmobile according to the present invention comprises a conventional body 1, front ski assembly 2 and endless track 3. The snowmobile illustrated in FIGS. 1 to 8 inclusive includes a rear ski assembly 4 and a suspension arm system 5 pivotally attaching the rear ski assembly and the rear end of the endless track 3 to the rear end of the body 1. The rear ski assembly includes a pair of skis 6 longitudinally extending in the fore and aft direction and laterally spaced apart transversely of the snowmobile. Each ski 6 is provided with lugs at 7 to which are attached the opposite ends of a leaf spring 8. A bracket 9 is fixedly secured on the curved uppermost portion of each spring 8 and is used to pivotally connect each ski 6 on a corresponding end of a ski axle 10.

The endless track 3 has its rear end portion looped around sprocket wheels 11 mounted on a rear axle 12. The suspension arm system includes a pair of fore and aft suspension arms 13 laterally spaced apart transversely relative to the snowmobile. The suspension arms 13 at their front end carry the rear axle 12 and at their rear end they are fixedly attached to a tubular bearing member 14 rotatably carrying the ski axle 10. Thus, the suspension arms 13 are pivotally connected relative to the endless track 3 and to the rear ski assembly 4.

A resilient suspension pivotally and resiliently carries the suspension arms 13 and includes crank arm units 15 and 16. The crank arm unit 15 includes a tubular portion pivotally engaged on a transverse rod, or the like, secured to the body 1 of the snowmobile. Thus, the crank arm unit 15 is pivotable around a fixed transverse axis relative to the body of the snowmobile. The crank arm unit 16 is pivotally suspended to the crank arm unit 15 on a transverse axle carried by the latter. Thus, the crank arm units 15 and 16 are connected one to the other to form a knee-like articulation between them. The crank arm unit 16 includes a second tubular portion carrying another transverse axle on the opposite ends of which the arms 13 are mounted to form a pivotal connection between the crank arm unit 16 and the suspension arms. A pair of coil springs 17 are connected between the two crank arm units 15 and 16 to bias the latter toward downward extension of the crank arm unit 16.

An adjustment assembly is provided to adjust the height of the rear ski assembly 4 relative to the rear of the endless track 3. The illustrated adjustment assembly comprises a rod 18 that is fixedly attached at one end to the articulation between the crank arm units 15 and 16 and is slidably connected relative to the tubular member 14. The adjustment rod 18 longitudinally extends fore and aft and is similarly slidable endwise relative to the transverse ski axle 10. A catch and a remote control, best shown in FIGS. 7 and 8, operatively hold the rod 18 in adjusted position relative to the ski axle 10. This catch includes a bracket 19 fixedly secured to the tubular member 14 and radiating therefrom into a pair of upwardly-projecting lugs or projections 20 and 21 having aligned apertures in which the adjustment rod 18 is slidably adjustable endwise. A pair of clamps 22 and 23 are pivotally connected to the bracket 19 on opposite sides respectively of the ski axle 10 and are also apertured for passage of the adjustment rod 18 through them with some play. A coil spring 24 is engaged around the adjustment rod 18 in axial abutment at its opposite ends with the two clamps 22, 23 to bias them away from each other and, thus, frictionally catch the adjustment rod against axial displacement.

The pivoting of the clamps 22, 23 toward each other against the bias of the coil spring 24, that is in the direction of the arrows 25, may be done by hand when the snowmobile is stopped and it may also be done by the user of the snowmobile when he is riding it. This is done by a remote control mechanism including a rotary cam 26 provided with a radial arm 27, a push-pull cable 28 connected at one end to the arm 27 and a hand lever, or handle, connected to the other end of the actuator cable 27 within reach of the user riding the snowmobile.

When the user of the snowmobile actuates the handle connected to the cable 27, he may rotate the cam 26 to pivot the clamps 22, 23 toward each other, as may also be done by hand as aforementioned. Then the rod 18 is freed and can slide either forward or rearward to either shorten or extend its effective length. As can be seen in FIGS. 2 and 5, when the effective length of the adjustment rod is shortened, the crank arm units 15 and 16 angularly move toward each other, thereby elevating the rear ski assembly 4 higher than the rear end of the endless track 3. When the adjustment rod 18 slides forward relative to the ski axle 10, its effective length increases and the crank arm units 15,16 become more extended downwardly. Then the rear ski assembly may be lowered level with the rear end of the endless track, as shown in FIG. 4, and even lower, as shown in FIGS. 3 and 6.

In the embodiment illustrated in FIGS. 9 to 15 inclusive, the rear ski and suspension assembly similarly includes a rear ski assembly 28 and a suspension arm system 29 pivotally attaching the rear ski assembly and the rear end of the endless track 3 to the rear end of the body 1 of a snowmobile. The rear ski assembly includes a pair of skis 30 longitudinally extending in the fore and aft direction and laterally spaced apart transversely of the snowmobile. Each ski 30 is provided with a leaf spring 31 on the uppermost portion of which is pivoted a transverse ski axle. A handle 32 is preferably provided at the rear end of each ski 30 to help maneuvering the rear of the snowmobile. A spring wire 33 is mounted on the ski axle adjacent each ski 30 and engages under the leaf spring 31 to resiliently restrain the corresponding ski against nose-diving.

The endless track 3 has its rear end portion looped around sprocket wheels 11 mounted on a rear axle 12. A tubular bearing member 34 is relatively engaged over the afore-mentioned ski axle for the rear skis 30. The suspension arm system includes a pair of fore and aft suspension arms 35 laterally spaced apart transversely relative to the snowmobile. The suspension arms 35 are fixedly secured at one end to the tubular bearing member 34 to thus be pivotally connected relative to the rear ski assembly 28.

A resilient suspension pivotally and resiliently carries the suspension arms 35 and the rear axle 12 of the endless track 3. This resilient suspension includes a crank arm unit 35. The latter includes a tubular portion pivotally engaged on a transverse rod, or the like, secured to the body 1 of the snowmobile. Thus, the crank arm unit 36 is pivotable around a fixed transverse axis relative to the body of the snowmobile. A pair of intermediate arms 37 are pivotally suspended to the crank arm unit 36. The arms 37 and the crank arm unit 36 thus define a knee-like articulation and a transverse axis at that articulation. The intermediate arms 37 rotatively carry the rear axle 12 at the rear end of the endless track and they are pivotally connected to the suspension arms 35 to carry their front end.

A pair of resilient shock-absorbers 38 are pivotally connected at their opposite ends to the tubular member 34 and to the intermediate arms 37 to resiliently bias the rear skis 30 downwardly.

An adjustment assembly is provided to adjust the height of the rear ski assembly 28 relative to the rear of the endless track 3. The adjustment assembly in the embodiment of FIGS. 9 to 15 inclusive comprises a tubular portion 39 and a rod portion 40 that is slidably adjustable endwise to the tubular portion. The outer end of the tubular portion 39 is pivotally connected to the tubular member 34 and the outer end of the rod portion 40 is pivotally connected to a another tubular member 41 extending transversely between the intermediate suspension arms 37. As best shown in FIGS. 13, 14, and 15, rod portion 40 is provided with at least 2 or 3 adjustment notches 42 along one of its edges. The rod portion 40 is also provided with a hole 43 extending through it to pass a pin, not shown, through it to lock the rod 40 in the extended position as shown in FIG. 13.

A latch 44 is pivoted at 45 to be selectively engaged with one of the notches 42 upon actuation by a cable 46 for remote operation of the latch as defined in relation with the first embodiment. Thus, the variation of the length of the adjustment assembly, or arm 39-40, pivots the intermediate arms 37 either upward or downward to either lower the endless track and raise the rear skis, or to raise the endless track and to lower the skis, as shown in FIGS. 11 and 12, respectively, relative to the neutral position of FIG. 10.

What I claim is:

1. For a snowmobile including a body having a front end and a rear end, a front ski assembly attached to the body and carrying the front end thereof, an endless track attached to the body and carrying the rear end thereof, a rear ski and suspension assembly comprising a rear ski assembly and a suspension arm system pivotally attaching the rear ski assembly to the rear end of the body for vertical pivoting displacement of the rear ski assembly about a transverse pivot axis relative to the body, said suspension arm system including a pair of suspension arms longitudinally extending in fore-and-aft direction, and pivotally connecting the endless track and the rear ski assembly relative one to the other, and a resilient suspension pivotally connecting the suspension arms relative to the body for resilient up-and-down displacement of the suspension arms relative to the body.

2. A rear ski and suspension assembly as defined in claim 1, wherein the suspension arm system includes an adjustment assembly connecting the resilient suspension relative to the suspension arms for selective pivotal adjustment of the latter and relative vertical adjustment of the endless track and rear ski assembly.

3. A rear ski and suspension assembly as defined in claim 2, wherein the adjustment assembly includes a remote control mechanism constructed and arranged for remote pivotal adjustment of the suspension arms by the user in riding position on the snowmobile.

4. A rear ski and suspension assembly for a snowmobile as defined in claim 3, wherein the endless track thereof includes a front end attached to the body and a rear end including a rear axle rotatably supported by the suspension arms and adjustable up-and-down upon pivotal adjustment of the suspension arms, the rear ski assembly includes a transverse axle and a pair of rear skis pivotally secured on the opposite area respectively of the transverse axle, and the pair of suspension arms are laterally spaced apart and rotatably carry the opposite ends respectively of the rear axle at one end and the transverse axle at the other end.

5. A rear ski and suspension assembly as defined in claim 4, wherein the resilient suspension includes a first crank arm unit pivotally connecting to said body for rotation about one transverse axis, relative to the body, a second crank arm unit pivotally suspended from the first crank arm unit about another transverse axis, defining an articulation spaced from each one transverse axis, and pivotally carrying the suspension arms, and resilient means connected to the second crank arm unit and downwardly biasing the latter relative to said body toward resilient engagement of the rear end of the endless track and the rear ski assembly with the ground, and the adjustment assembly includes a link interconnecting said articulation and said transverse axle and adjustably defining the spacing between the same and a catch releasably holding said link in adjusted position.

6. A rear ski and suspension assembly as defined in claim 5, wherein said link includes a rod connected at one end to said articulation, slidable endwise longitudinally relative to the snowmobile and to said transverse axle, said catch includes a clamp spring biased into operative clamping and holding engagement with the rod against endwise sliding thereof, and the remote control mechanism includes a cam device in operative engagement with the clamp, a push-pull cable connected to the cam device, and a hand control member connected to the push-pull cable and operatively actuating the same and releasing the clamp from clamping engagement with the rod, thereby allowing endwise adjustment of the latter.

7. A rear ski and suspension assembly as defined in claim 1, wherein the resilient suspension includes a first crank arm unit pivotally connected to said body for rotation about one transverse axis relative to the body, a second crank arm unit pivotally suspended from the first crank arm unit about another transverse axis, defining an articulation spaced from said one transverse axis, and pivotally carrying the suspension arms, and resilient means connected to the second crank arm unit and downwardly biasing the latter relative to said body toward resilient engagement of the rear end of the endless track and the rear ski assembly with the ground.

8. A rear ski and suspension assembly as defined in claim 1, wherein the resilient suspension includes a crank arm unit pivotally connected to said body for rotation about one transverse axis relative to the body, a pair of intermediate arms pivotally connected and suspended from the crank arm unit about another transverse axis, defining an articulation spaced from said one transverse axis, pivotally connected to the suspension arms respectively, and rotatively carrying the rear end of the endless track, and resilient shock absorbers connecting the rear ski assembly to the intermediate arms and downwardly biasing the latter relative to the body toward resilient engagement of the rear end of the endless track with the ground.

9. A snowmobile comprising a body having a front end and a rear end, a front ski assembly attached to the body and carrying the front end thereof, an endless track attached to the body and carrying the rear end thereof, a rear ski assembly and a suspension arm system pivotally attaching the rear ski assembly and the endless track to the rear end of the body for vertical pivoting displacement of the rear ski assembly and the endless track about a transverse pivot axis relative to each other and to the body, said suspension arm system including a pair of suspension arms longitudinally extending in fore-and-aft direction, and pivotally connecting the endless track and the rear ski assembly relative one to the other, and a resilient suspension pivotally connecting the suspension arms relative to the body for resilient up-and-down displacement of the suspension arms relative to the body.

* * * * *